United States Patent [19]

Ebersberger

[11] 4,184,075
[45] Jan. 15, 1980

[54] X-RAY DIAGNOSTIC GENERATOR COMPRISING AN INVERTER FEEDING THE HIGH VOLTAGE TRANSFORMER

[75] Inventor: Otto Ebersberger, Erlangen, Fed. Rep. of Germany

[73] Assignee: Siemens Aktiengesellschaft, Berlin & Munich, Fed. Rep. of Germany

[21] Appl. No.: 940,784

[22] Filed: Sep. 8, 1978

[30] Foreign Application Priority Data

Nov. 11, 1977 [DE] Fed. Rep. of Germany ....... 2750544

[51] Int. Cl.² ............................................. H05G 1/00
[52] U.S. Cl. .................................. 250/402; 250/413; 250/417
[58] Field of Search ............... 250/401, 402, 408, 409, 250/413, 417, 418, 421

[56] References Cited

U.S. PATENT DOCUMENTS

| | | | |
|---|---|---|---|
| 3,320,477 | 5/1967 | Boeker | 250/421 |
| 3,828,194 | 8/1974 | Grasser | 250/408 |
| 3,978,339 | 8/1976 | Aichenger | 250/421 |
| 4,053,778 | 10/1977 | Franke | 250/408 |
| 4,117,334 | 9/1978 | Strauts | 250/421 |

Primary Examiner—Craig E. Church
Attorney, Agent, or Firm—Hill, VanSanten, Steadman, Chiara & Simpson

[57] ABSTRACT

An inverter for an x-ray diagnostic generator wherein the power rectifier is a three phase rectifier across the output of which are connected two smoothing capacitors in series, the connection point therebetween having the common supply conductor connected therewith. There is disposed in parallel with the smoothing capacitors a series circuit comprising a thyristor, two inductances, and an additional thyristor. One diode is connected in antiparallel fashion with each of the thyristors, and the connection points of the inductances and of the smoothing capacitors are connected with one another by an oscillatory capacitor. The output voltage is tapped at the oscillatory capacitor. Either single phase or three phase power may be supplied directly to the rectifier without the use of an input transformer.

1 Claim, 2 Drawing Figures

X-RAY DIAGNOSTIC GENERATOR COMPRISING AN INVERTER FEEDING THE HIGH VOLTAGE TRANSFORMER

BACKGROUND OF THE INVENTION

The invention relates to an x-ray diagnostic generator comprising an x-ray tube, a high voltage transformer feeding the x-ray tube, an inverter connected to the input of the high voltage transformer, and a mains (or power) rectifier feeding the inverter.

In the case of an X-ray diagnostic generator of this type, it is possible to select the feed frequency of the x-ray tube in the kHz-range; i.e., substantially higher than the mains frequency. On account of this high feed frequency, the high voltage transformer can be provided with a substantially smaller and more lightweight construction than in the case of an x-ray diagnostic generator which is operated with the mains frequency.

SUMMARY OF THE INVENTION

The object underlying the invention consists in constructing an x-ray diagnostic generator of the type initially cited such that it can be selectively connected to a three phase mains (or supply network) or to a single phase mains, and that, independent of the type of mains at which it is operated, a largely constant peak voltage is guaranteed at the input of the high voltage transformer and hence at the x-ray tube.

This object is achieved in accordance with the invention by virtue of the fact that the mains rectifier is a three-phase rectifier, at the output of which there is connected a series circuit consisting of two capacitors whose connection point is connected with the terminal for receiving neutral power supply conductor, that there is connected in parallel with the capacitor series circuit a further series circuit comprising an electronic switch, two inductances, and an additional electronic switch, that the electronic switches are connected to a control device for the purpose of alternate switching-on thereof, that there is disposed between the connection point of the capacitors and the inductances, an oscillatory capacitor to which the primary winding of the high voltage transformer is connected, and that there is connected in parallel with each electronic switch, a diode which is polarized such that it takes over the discharge current of the oscillatory capacitor pursuant to opening of the corresponding electronic switch. In the inventive x-ray diagnostic generator, pursuant to operation at a three phase mains, the three phase rectifier is connected to the three phases, and the neutral conductor is connected to the connection point of the capacitors. Pursuant to operation at a single phase (or monophase) mains, the three inputs of the three phase rectifier can be connected with one another and with the phase of the single phase mains, whereas the neutral conductor is likewise connected to the connection point of the two capacitors. The two capacitors ensure a largely constant peak voltage at the x-ray tube.

The invention shall be explained in greater detail in the following on the basis of a sample embodiment illustrated in the accompanying sheets of drawings; and other objects, features and advantages will be apparent from this detailed disclosure and from the appended claims.

DETAILED DESCRIPTION

Figure 1:
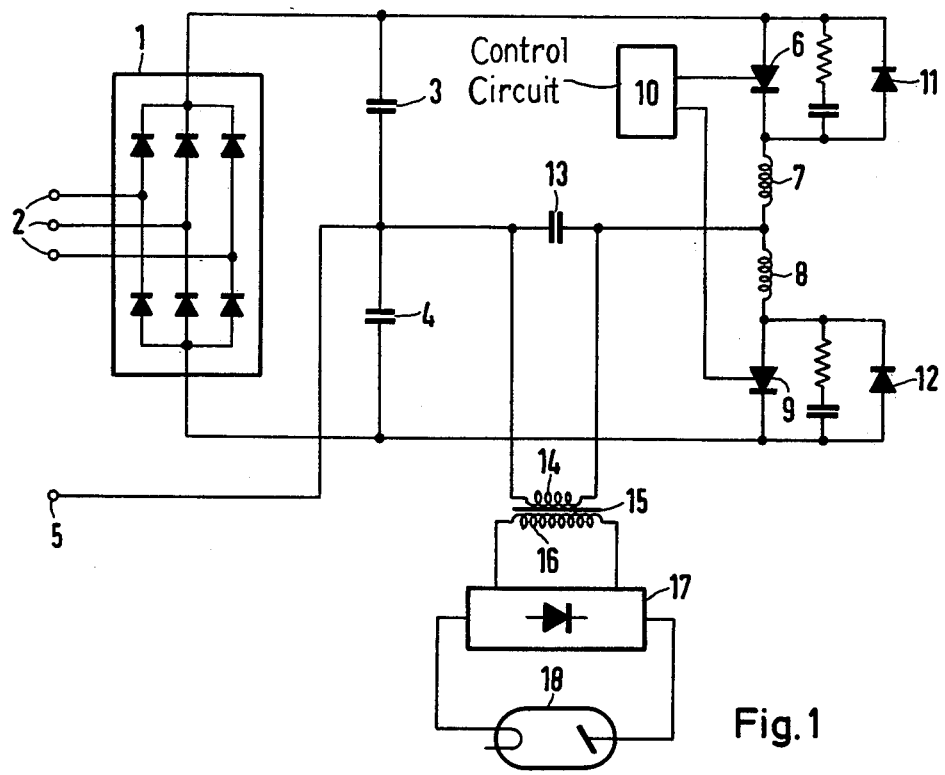
FIG. 1 illustrates a circuit diagram of an x-ray diagnostic generator in accordance with the invention.

In FIG. 1, a three phase rectifier 1 is illustrated which is connectable to the three phases of a three phase network via terminals 2. At the output of the three phase rectifier 1, there is connected a series circuit consisting of two smoothing capacitors 3 and 4 whose connection point receives the connection of the neutral power supply conductor at a terminal 5. There is connected in parallel with the series circuit consisting of capacitors 3 and 4, a further series circuit comprising a thyristor 6, two inductances 7, 8 and a thyristor 9. The thyristors 6 and 9 are connected to a control device 10 for the purpose of alternate switching-on thereof. One diode 11 and 12 each is connected in antiparallel fashion with each of the thyristors 6 and 9. Between the connection points of capacitors 3 and 4 and inductances 7 and 8 there is disposed an oscillatory capacitor 13 to which the primary winding of a high voltage transformer 15 is connected. The secondary winding 16 of the high voltage transformer 15 feeds an x-ray tube 18 via a high voltage rectifier 17.

Figure 2:
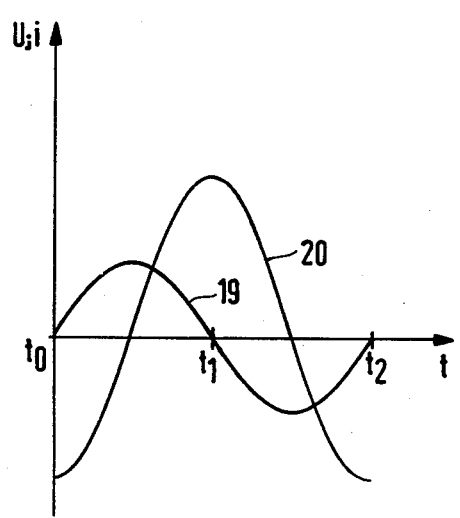
FIG. 2 illustrates curves for the purpose of explaining the mode of operation of the x-ray diagnostic generator according to FIG. 1.

If the x-ray diagnostic generator illustrated in FIG. 1 is to be operated at the three phase mains with a neutral conductor, the three phases of the three phase mains are connected to the terminals 2, and the neutral conductor is connected to terminal 5. Capacitors 3 and 4 are charged to a voltage of 220 V·$\sqrt{2}$=311 V. If, for the purpose of setting inverter 6 through 13 into operation, thyristor 6 is first ignited via the control device 10, a charging current flows from capacitor 3 via thyristor 6 and the inductance 7 to capacitor 13, as a consequence of which capacitor 13 is charged to a voltage which lies above the voltage of capacitor 3. The thyristor 6 is extinguished when the charging current has become zero. This is the case at the time t1 in the diagram of FIG. 2. In FIG. 2, curve 19 illustrates the amplitude of the current (i) at the capacitor 13. Subsequent to the extinction of thyristor 6, the voltage (U) at oscillatory capacitor 13, which is higher in comparison with the voltage at capacitor 3, drives a discharge current via diode 11. This discharge current has become zero at the time t2 in FIG. 2. Accordingly, there is connected to the primary winding 14 of the high voltage transformer 15, between the times t0 and t2, an approximately sinusoidally progressing voltage surge (or wave) corresponding to curve 20 in FIG. 2. If thyristor 9 is now ignited, the illustrated operations are repeated in an analogous fashion in conjunction with components 4, 8, 9, 12. Subsequently there again takes place an ignition of thyristor 6, etc.

The frequency of the feed voltage of the high voltage transformer 15 is adjustable by determining the ignition times of thyristors 6 and 9. If, following extinction of thyristor 6, thyristor 9 is ignited at a later time than time t2, the feed frequency is lower than in the example illustrated in FIG. 2. Correspondingly, naturally, following extinction of thyristor 9, thyristor 6 must then also be ignited later. If, subsequent to the extinction of thyristor 6 at time t1, thyristor 9 is ignited between times t1 and t2 following the release time of thyristor 6, and if thyristor 6 is also correspondingly ignited in relation to the extinction times of thyristor 9, a frequency increase takes place as compared with the instance illustrated in FIG. 2.

During operation of the x-ray diagnostic generator at a three phase mains without a neutral conductor, terminal 5 remains free. A peak voltage of 380 V·$\sqrt{2}$=537 V results at the series connection of capacitors 3, 4.

If the x-ray diagnostic generator illustrated in FIG. 1 is to be operated at a single phase alternating current mains, the three terminals 2 are expediently short-circuited, and connected to the phase of the alternating current mains. The zero or ground potential conductor of the single phase supply is connected to terminal 5.

During operation at a three phase mains or at a single phase alternating current mains, capacitors 3 and 4 ensure a smoothed (or filtered) input voltage for the inverter 6 through 13, such that the peak voltage at primary winding 14, and hence also at x-ray tube 18, is largely constant. A good ray quality of the x-radiation emitted from the x-ray tube 18 is thereby guaranteed. The x-ray diagnostic generator is selectively operable in the described manner, without an input transformer, at a three phase mains or a single phase alternating current mains. During operation at a single phase alternating current mains, it is also conceivable to connect the phase only to one of the terminals 2.

It will be apparent that many modifications and variations may be effected without departing from the scope of the novel concepts and teachings of the present invention.

I claim as my invention:

1. An x-ray diagnostic generator comprising an x-ray tube, a high voltage transformer feeding the x-ray tube, an inverter connected to the input of the high voltage transformer, and a power rectifier feeding the inverter, characterized in that the power rectifier (1) is a three phase rectifier, two capacitors (3, 4) being connected in series across the three phase rectifier to form a capacitor series circuit (3, 4) and having a connection point for receiving a neutral supply conductor, a further series circuit comprising an electronic switch (6), two inductances (7, 8), and an additional electronic switch (9) connected in parallel with the capacitor series circuit, the electronic switches (6, 9) being controllable for the purpose of alternate switching-on thereof, an oscillatory capacitor connected between the connection points of the capacitors (3, 4) and the inductances (7, 8), the oscillatory capacitor (13) having a primary winding (14) of the high voltage transformer (15) connected therewith, and a diode (11, 12) connected in parallel with each electronic switch (6, 9), each diode being connected such that it assumes the discharge current of the oscillatory capacitor (13) pursuant to opening of the corresponding electronic switch (6, 9).

* * * * *